US009609435B2

(12) United States Patent
Osborn et al.

(10) Patent No.: US 9,609,435 B2
(45) Date of Patent: Mar. 28, 2017

(54) BATTERY-POWERED STEREO SPEAKER ASSEMBLY HAVING POWER CONNECTION FOR CHARGING A HANDHELD DEVICE

(71) Applicants: Warren Robert Osborn, Provo, UT (US); Daniel Lester Hill, Provo, UT (US)

(72) Inventors: Warren Robert Osborn, Provo, UT (US); Daniel Lester Hill, Provo, UT (US)

(73) Assignee: Braven LC, Provo, UT (US)

( * ) Notice: Subject to any disclaimer, the term of this patent is extended or adjusted under 35 U.S.C. 154(b) by 406 days.

(21) Appl. No.: 13/648,276

(22) Filed: Oct. 9, 2012

(65) Prior Publication Data

US 2014/0098979 A1 Apr. 10, 2014

(51) Int. Cl.

| | |
|---|---|
| ***H04R 5/02*** | (2006.01) |
| ***H04R 25/00*** | (2006.01) |
| ***H04R 1/28*** | (2006.01) |
| ***H04R 9/06*** | (2006.01) |
| ***H02J 7/00*** | (2006.01) |
| ***H02J 9/00*** | (2006.01) |

(52) U.S. Cl.

CPC ............. *H04R 5/02* (2013.01); *H04R 1/2834* (2013.01); *H04R 2205/022* (2013.01); *H04R 2420/07* (2013.01); *H04R 2420/09* (2013.01)

(58) Field of Classification Search

USPC ........ 381/120, 300, 332; 320/101, 108, 137; 307/24; 710/15

See application file for complete search history.

(56) References Cited

U.S. PATENT DOCUMENTS

2001/0053231 A1* 12/2001 Juszkiewicz ............. H04R 1/02 381/306
2007/0127758 A1* 6/2007 Pei ........................... H04R 5/02 381/335
2009/0061769 A1* 3/2009 Zimbric .............. H04M 1/7253 455/41.2
2012/0032531 A1* 2/2012 Cheng .................... H02J 7/0011 307/150
2012/0235636 A1* 9/2012 Partovi ................... H02J 7/025 320/108
2012/0250924 A1* 10/2012 Nicholson ................ H04R 1/02 381/334

(Continued)

*Primary Examiner* — Duc Nguyen
*Assistant Examiner* — Yogeshkumar Patel
(74) *Attorney, Agent, or Firm* — Angus C. Fox, III

(57) ABSTRACT

The present invention provides a portable and compact battery-powered stereo speaker assembly that incorporates a DC to DC converter, which enables power from the internal stereo speaker assembly battery to charge an interconnected hand-held device, such as a smartphone, through a USB connection, thereby extending the time that the device can be used untethered from the AC power grid. A DC to DC converter enables the charging function can be implemented even if the speaker assembly is not connected to the AC power grid, and even if the battery of the stereo speaker assembly is not fully charged. The stereo speaker assembly also incorporates Bluetooth connectivity, a proprietary open wireless technology standard, developed by Ericsson in 1994, employing frequency-hopping spread spectrum radio transmissions in the ISM band from 2400-2480 MHz.(134)

20 Claims, 17 Drawing Sheets

(56) References Cited

U.S. PATENT DOCUMENTS

| | | | | |
|---|---|---|---|---|
| 2012/0300962 | A1* | 11/2012 | Devoto | 381/300 |
| 2013/0324167 | A1* | 12/2013 | Bevil | H04M 1/725<br>455/458 |

* cited by examiner

FIG. 20
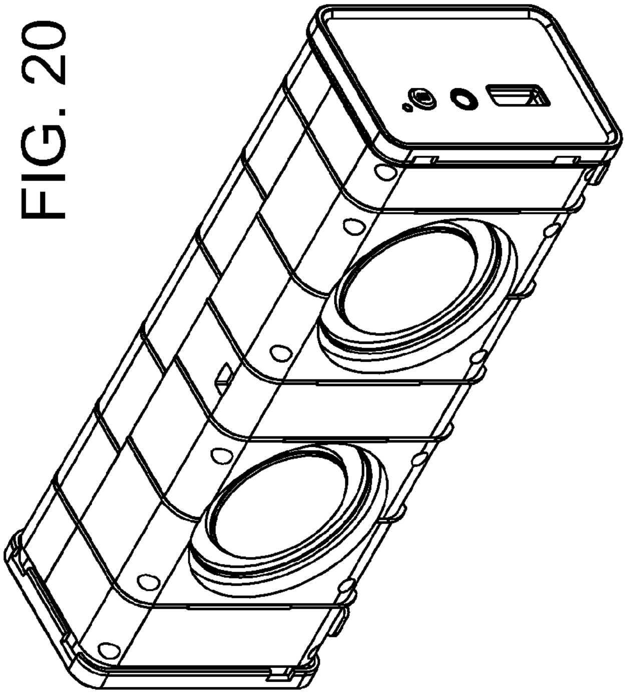
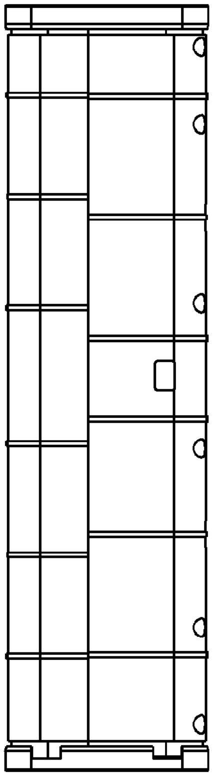
FIG. 21
FIG. 19
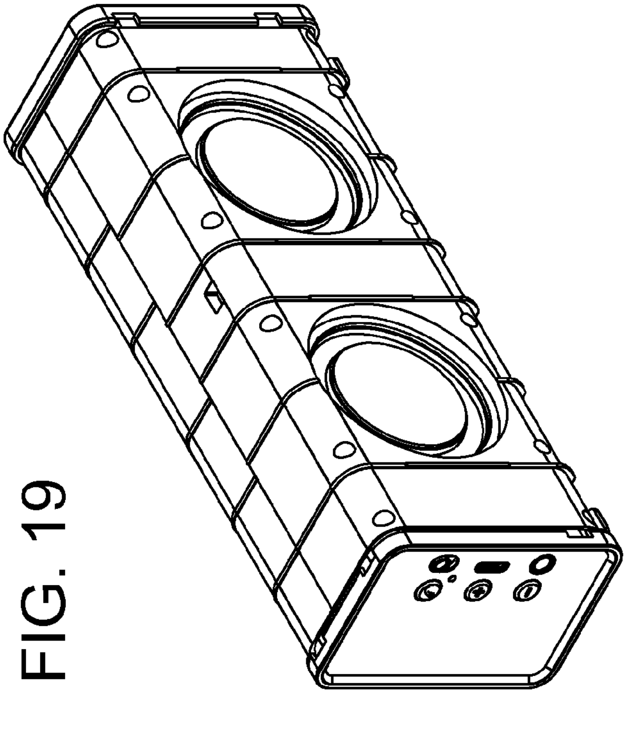

BATTERY-POWERED STEREO SPEAKER ASSEMBLY HAVING POWER CONNECTION FOR CHARGING A HANDHELD DEVICE

This application has a priority date of Oct. 7, 2011 based on the filing, by the same inventors, of Provisional Patent Application No. 61/544,998, titled BATTERY-POWERED STEREO SPEAKER ASSEMBLY HAVING POWER CONNECTION FOR CHARGING A HANDHELD DEVICE.

BACKGROUND OF THE INVENTION

Field of the Invention

This invention relates, generally, to audio speakers and, more particularly, to wireless portable speaker assemblies which are intended for use with handheld devices, such as smartphones and MP3 players.

Description of the Prior Art

A smartphone is a mobile cellular telephone that offers more advanced computing ability and connectivity than a contemporary basic feature phone. Smartphones are essentially handheld computers integrated within a cellular telephone. Growth in demand for smartphones boasting powerful processors, abundant memory, larger screens, and open operating systems has outpaced the rest of the mobile phone market for several years. According to a study by ComScore, over 45.5 million people in the United States owned smartphones in 2010 and it is the fastest growing segment of the mobile phone market, which comprised 234 million subscribers in the United States. In 2011, 492.3 million people purchased new smartphones.

The first smartphone, called Simon, was designed by IBM in 1992, released to the public in 1993 and sold by BellSouth. Besides being a mobile phone, it also contained a calendar, address book, world clock, calculator, note pad, e-mail, send and receive fax, and games. Customers used a touch-screen to select phone num bers with a finger or create facsimiles and memos with an optional stylus. Text was entered with a unique on-screen "predictive" keyboard. In 1997 Ericsson released the concept phone GS88—the first device labeled as a smartphone. In 2000 Ericsson released the touchscreen smartphone R380, the first device to use the new Symbian OS. It was followed up by P800 in 2002, the first camera smartphone.

In 2001, Microsoft announced that its Windows CE Pocket PC operating system (OS) would be offered as Microsoft Windows Powered Smartphone 2002. Microsoft originally defined its Windows Smartphone products as lacking a touchscreen and offering a lower screen resolution compared to its sibling Pocket PC devices.

In early 2002, Handspring released the Palm OS Treo smartphone, utilizing a full keyboard that combined wireless web browsing, email, calendar, and contact organizer with mobile third-party applications that could be downloaded or synced with a computer.

Also in 2002, Research In Motion (RIM) released the first BlackBerry, which was the first smartphone optimized for wireless email use. By December 2009, it had achieved a total customer base of 32 million subscribers by December 2009.

In 2007 Nokia launched the Nokia N95, a consumer-oriented smartphone which integrated a wide range of features: GPS, a 5 megapixel camera with autofocus and LED flash, 3G and wi-fi connectivity, and TV-out. In the next few years these features would become standard on high-end smartphones.

Later in 2007, Apple Inc. launched its first iPhone on the AT&T cellular network. It was initially expensive—costing $500 for the cheaper of two models on top of a two year contract. It was one of the first smartphones to be mainly controlled through its touchscreen (the others being the LG Prada and the HTC Touch, which were also released in 2007). Not only was it the first mobile phone to use a multi-touch interface, it also featured it featured a web browser that was vastly superior to those in use by its competitors. Though Steve Jobs publicly stated that the iPhone lacked 3G support due to the immaturity, power usage, and physical size requirements of 3G chipsets at the time, it was rumored that the CDMA2000 Network Providers (Verizon and Sprint) refused to allow the iPhone on their network because Jobs wanted total control of the application store associated with the iPhone. In July 2008, Apple introduced its second generation iPhone which had a lower upfront price and 3G support. It also created the App Store with both free and paid applications. The App Store can deliver smartphone applications developed by third parties directly to the iPhone or iPod Touch over wifi or cellular network without using a PC to download. The App Store has been a huge success for Apple and by April 2010 hosted more than 185,000 applications. The App Store hit three billion application downloads in early January 2010. The iPhone 3GS was the third generation of iPhone designed and marketed by Apple Inc. Introduced on Jun. 8, 2009, it provided faster performance, a camera with higher resolution and video capability, voice control, and support for 7.2 Mbit/s HSDPA downloading. The iPhone 4, which is the fourth generation iPhone, is particularly marketed for video calling, consumption of media such as books and periodicals, movies, music, and games, and for general web and e-mail access. At this writing, an updated version of the iPhone 4, that is rumored to have an 8-megapixel camera, will be released on Oct. 5, 2011 as the iPhone 5.

Android, a cross platform operating system for smartphones, was released in 2008. Android is an Open Source platform backed by Google, along with major hardware and software developers (such as Intel, HTC, ARM, Motorola and Samsung, to name a few), that form the Open Handset Alliance. The first phone to use the Android OS was the HTC Dream, branded for distribution by T-Mobile as the G1. The software suite included on the phone consists of integration with Google's proprietary applications, such as Maps, Calendar, and Gmail, and a full HTML web browser. Third-party applications (apps) are available via the Android Market, including both free and paid apps. As of the third quarter of 2010, 43.6 percent of the smartphones sold in the U.S. used the Android OS, up 11 percent from the previous quarter and up from only 2 percent the previous year. Apple came in second with 23 percent, up 1 percent, followed by RIM in third place, which declined from 28 percent to 22 percent.

For the past several years, smartphones running Microsoft Windows Mobile operating system have languished in the marketplace, capturing less than 7 percent of the market for smartphones in mid-2011. With the release at the end of October 2010 of the Windows Phone 7 operating system, Microsoft hopes to revitalize the market for smartphones designed for Microsoft operating systems. Windows Phone 7 is an elegant operating system that is very different from the application-focused iOS and Android operating systems. Windows Phone 7 provides active and configurable interface elements, called tiles, that update on the fly with real information, allowing users to place the tiles that interest them most wherever they choose on their Start screens. Facebook photos, music and contacts are pulled into the phone and distributed appropriately across Hubs. It also brings together many of Microsoft's popular offerings from other platforms, including Xbox, Zune, Office and Bing.

As of the first quarter of 2012, smartphones running the Android operating system garnered 64 percent of new smartphone sales; smartphones from Apple managed a 19 percent market share; smartphones running the Symbian operating system owned 6 percent of the market; RIM smartphones had a 5 percent market share; and smartphones running the Bada and Windows 7 Phone operating systems each had a 3 percent share.

Most high-end smartphones, whether they use operating systems from Apple, Google, RIM or Microsoft, now have front and rear cameras, with autofocus lenses and 8 megapixel front-camera sensors. With specifications like these, smartphones have become acceptable substitutes for dedicated digital cameras. At the end of 2011, nearly 30 percent of all photographs were taken by smartphones. This represents a significant increase from 17% in 2010. For many people, smartphones have replaced point-and-shoot cameras.

There are two characteristics common to all smartphones. Firstly, they have voracious appetites for power that typically deplete battery charge in less than 12 hours—even when operating in standby mode. Worse yet, if a smart phone is operating in a transmitting mode, whether via cellular telephony or connection to a 3G or 4G network, battery life will be shortened precipitously. In fact, a web browsing session can reduce battery life to less than an hour. Secondly, they have internal speakers which provide neither high-fidelity sound nor sufficient volume for group use as a speaker phone. Furthermore, even at moderate volume levels, sound quality suffers from distortion. The problem has been exacerbated by Apple's trendy insistence on style over function. As Apple mobile products have become thinner, there is less space for audio speakers. Apple's faithful must rely on headphones for high-fidelity sound. This is true for not only Apple's iPhone products, but its iPad tablet computers, as well.

During the past two and a half (this is being written in October, 2012), tablet computers have taken the world by storm. A tablet computer, or simply tablet, is a complete mobile computer, having an integrated flat touch screen that is primarily operated by touching the screen, that is larger than a mobile phone or personal digital assistant. It typically uses an onscreen virtual keyboard or a digital pen rather than a physical keyboard. In 2001, Microsoft Corporation introduced the Microsoft Tablet PC, which was a touch-screen X86 computer intended for business field work. However, the device failed to achieve widespread adoption not only because of its relatively high price, but also because usability problems that made it unsuitable for work outside of its limited intended purpose. In April 2010 Apple Inc. released the iPad®, a tablet computer with an emphasis on media consumption. The shift in purpose, together with increased usability, battery life, simplicity, lower weight and cost, and overall quality with respect to previous tablet computers, was perceived as defining a new class of consumer device that has continued to shape the com mercial market for tablet computers, which have come to be referred to as, simply, tablets. Apple has since released the iPad 2 and the iPad 3 (it does not actually bear the 3 moniker).

The Apple iPad uses the iOS operating system, which is a commercial derivative of FreeBSD, a free Unix-like operating system that descended from AT&T UNIX. Within months of release of the original iPad tablet, tablet computers were released by other companies which used the Linux-based Google Android operating system. These early Android-based tablets generally lacked the quality, performance and polish of the Apple iPad. In early 2011, Samsung released the Galaxy Tab 10.1 tablet computer. Though the subject of generally favorable reviews, it and other new Android tablets have not been able to slow the Apple juggernaut, which has benefitted from more polished applications, impeccable industrial design, an outstanding marketing program, and a fan base that possesses a seemingly irrational and unbridled exuberance for all things Apple. The introduction of the thinner, more elegant, and slightly more capable Apple iPad 2 in March 2011 has only increased the fervor of Apple faithful. Following Steve Job's dramatic announcement of the product, Apple sold 300,000 the day of its release.

Near the end of September 2011, Jeff Bezos, the Chairman and CEO of Amazon.com, announced a touch-screen tablet called the Kindle Fire. At $199, it costs $300 less than Apple's entry-level iPad 2, thereby putting it within reach of many more users than Apple's $499 (and up) device. On the other hand, it's smaller, runs a forked version of Android, has only 8GB of flash memory storage, doesn't have a camera, runs a subset of the tiny number of Android apps that "work" on other Android tablets, and is really more of a tablet wrapper for Amazon's services than it is a media tablet. Nevertheless, Amazon booked an estimated 95,000 preorders for the Kindle Fire on its first sales day. During each of the six subsequent days, an additional 20,000 were sold to reach a total of 215,000 as of October 5th. That number is quite remarkable, given that Bezos, unlike Jobs, has not been accorded rock star status.

Though tablet computers typically have much longer battery life, significantly higher resolution displays, and generally greater functionality than smartphones, audiophiles consider the output from their internal speakers to be nothing short of pathetic. The problem is not that powerful, high-fidelity audio speakers are unavailable, but rather that, in their quest to make tablet computers as thin and light as possible (the Apple iPad 2 is only 8.8 mm thick), manufacturers have left no room for powerful, high-fidelity speakers. With respect to the latest and greatest tablets, it is a maxim that high-fidelity sound is available only through the use of quality headphones or auxiliary speakers.

Sensing a need for greatly improved audio performance for both smartphones and tablet computers, as well as enhanced battery life for smartphones, innumerable companies are scrambling to fill the void. Many speaker assemblies having Bluetooth connectivity are available for smartphones and tablet computers. There is even a speaker assembly available that can charge a smartphone as long as the speaker assembly is connected to a 110-volt AC power outlet. In that device, the AC voltage is converted by an AC-DC converter to a secondary voltage that can charge a 5-volt lithium-ion battery. When the device is unplugged from the AC outlet, the charging capability is lost. Battery-powered laptop or notebook computers can typically charge a handheld device, such as a smartphone, from a USB port, even when the laptop computer is not connected to 120-volt AC line power via its AC-DC power supply. However, it should be kept in mind that a laptop computer is a full-featured digital computer rather than an accessory, such as a speaker assembly, which has no CPU, no RAM, and no data storage.

SUMMARY OF THE INVENTION

The present invention provides a portable and compact battery-powered stereo speaker assembly that incorporates a DC to DC converter, which enables power from the internal stereo speaker assembly battery to charge a hand-held device that draws a charge current of 1 ampere or less, thereby extending the time that the device can be used untethered from the AC power grid. Most smartphones meet this 1 ampere or less criterium; most tablet computers do not. The charging operation is performed using a USB cable, which interconnects the hand-held device to the speaker assembly. The DC to DC converter enables the charging function to be implemented even if the speaker assembly is not connected to the AC power grid, and even if the battery of the stereo speaker assembly is not fully charged. The stereo speaker assembly also incorporates Bluetooth connectivity, a proprietary open wireless technology standard, developed by Ericsson in 1994, employing frequency-hopping spread spectrum radio transmissions in the ISM band from 2400-2480 MHz. Using Class 2 Bluetooth, the audio-out signal from the handheld device can be wirelessly transmitted to the stereo speaker assembly over distances of up to about 10 meters. For a presently-preferred embodiment of the invention, the stereo speaker assembly has a power ON/OFF switch, a single LED that indicates a power ON condition, a separate USB B plug for charging the internal battery, a linear array of LEDs that indicate battery charge, audio volume adjustment controls, and a telephone call pickup button that lim its incoming audio signals to only those associated with a telephone call incoming on the handheld device.

BRIEF DESCRIPTION OF THE DRAWINGS

FIG. 19 is an isometric view of the new stereo speaker assembly, with the protective/decorative cover removed, showing the right end, top and rear thereof;

FIG. 20 is an isometric view of the new stereo speaker assembly, with the protective/decorative cover removed, showing the left end, top and rear thereof;

FIG. 21 is a top plan view of the new stereo speaker assembly with the protective/decorative cover removed;

DETAILED DESCRIPTION OF THE INVENTION

The invention will now be described in detail with reference to the attached drawing figures.

Referring now to FIGS. 1 to 10, the fully assembled audio speaker assembly 100 has a generally rectangular box shape with rounded longitudinal edges. An extruded aluminum cover 101 wraps around an internal housing. It will be noted that the panels 700 and 1000 at both ends of the assembly 100 contain all controls and indicator LEDs, as well as input and output jacks. It will be noted that the circular outline of the left and right woofers 801L and 801R, respectively, are visible in FIG. 8. It will be further noted that the circular outline of the passive bass radiators 901L and 901R, respectively, are visible in FIG. 9.

Figure 7:
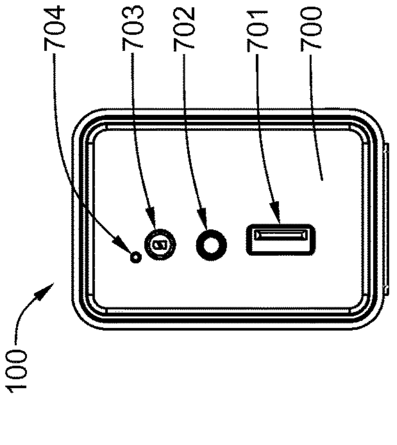
FIG. 7 is a left end elevational view of the new, fully-assembled stereo speaker assembly.
Figure 11:
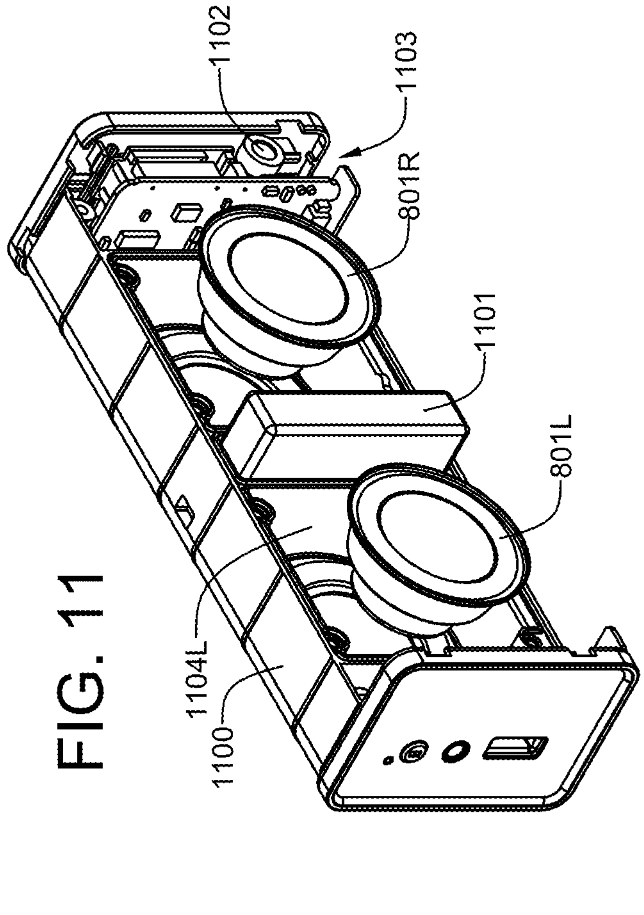
FIG. 11 is an isometric view of the new stereo speaker assembly with the protective/decorative cover removed, showing the left end, top and front thereof.
Figure 12:
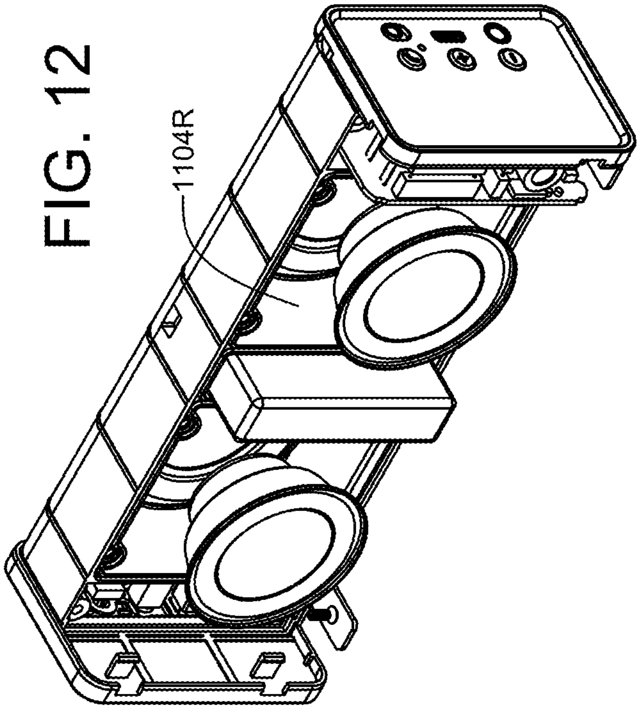
FIG. 12 is an isometric view of the new stereo speaker assembly with the protective/decorative cover removed, showing the right end, top and front thereof.
Figure 13:
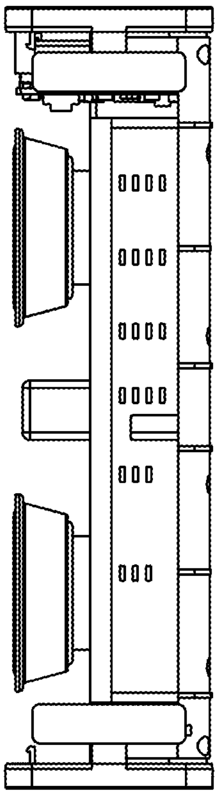
FIG. 13 is a top plan view of the new stereo speaker assembly with the protective/decorative cover removed.
Figure 16:
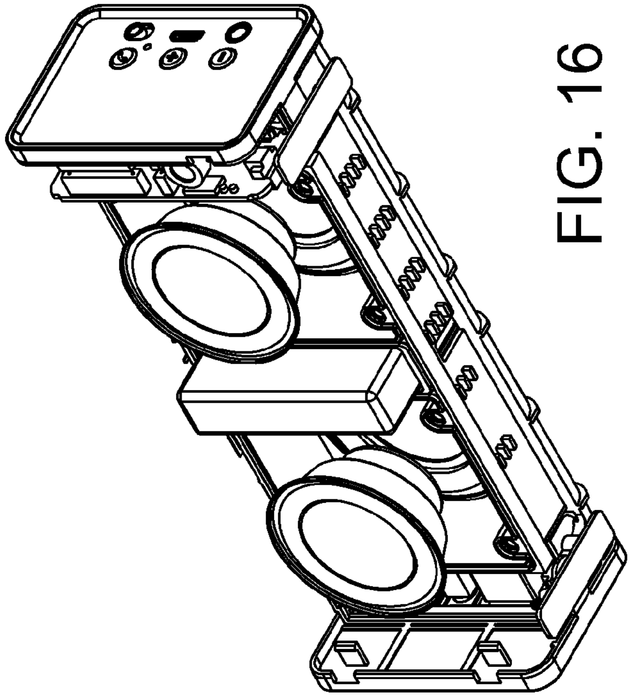
FIG. 16 is an isometric view of the new, fully-assembled stereo speaker assembly, with the protective/decorative cover removed, showing the right end, bottom and front thereof.
Figure 14:
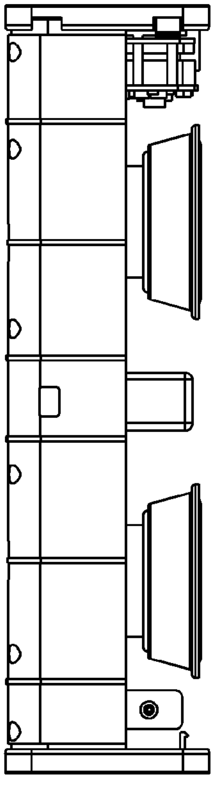
FIG. 14 is a bottom plan view of the new stereo speaker assembly with the protective/decorative cover removed.
Figure 15:
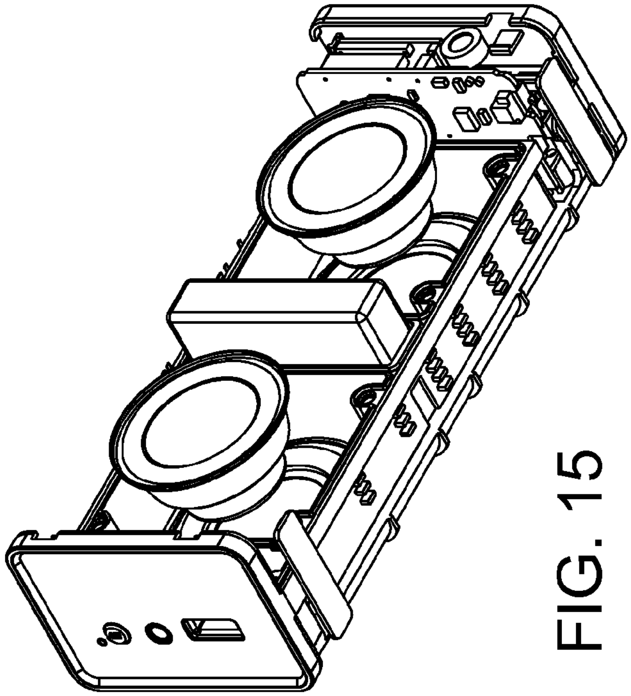
FIG. 15 is an isometric view of the new, fully-assembled stereo speaker assembly, with the protective/decorative cover removed, showing the left end, bottom and front thereof.
Figure 17:
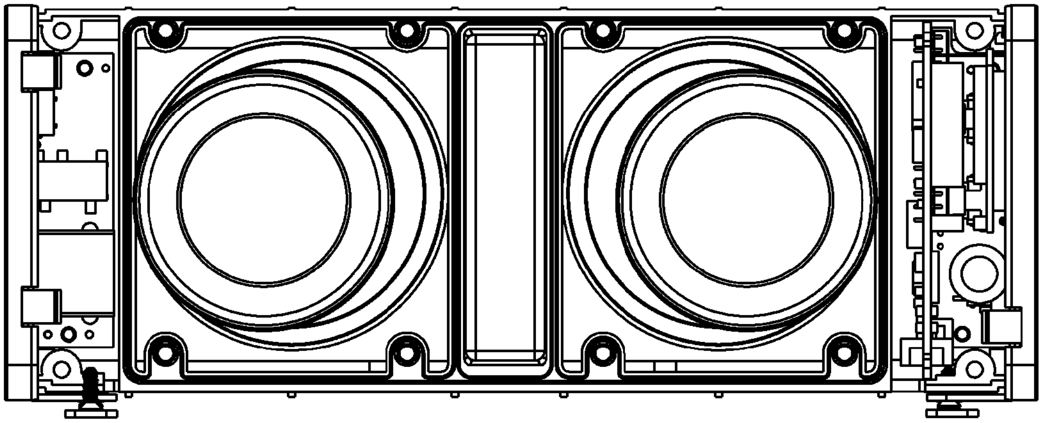
FIG. 17 is a front elevational view of the new stereo speaker assembly, with the protective/decorative cover removed.
Figure 18:
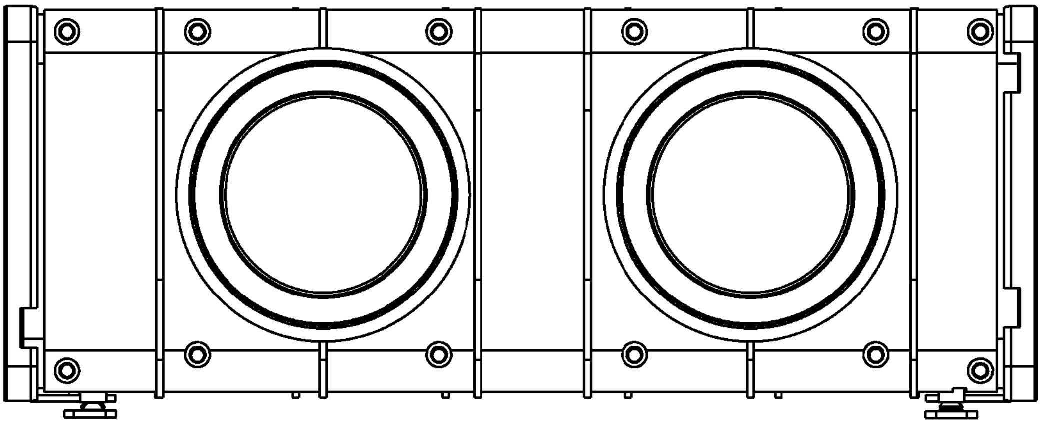
FIG. 18 is a rear elevational view of the new stereo speaker assembly, with the protective/decorative cover removed.
Figure 24:
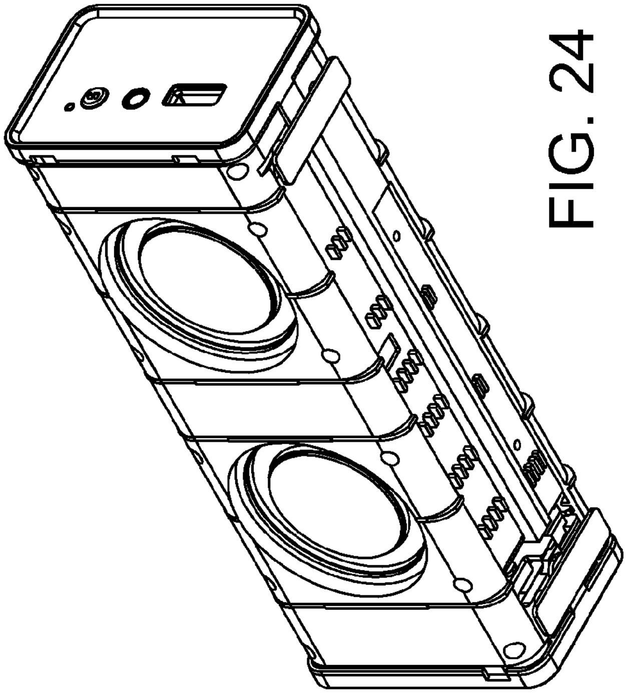
FIG. 24 is an isometric view of the new stereo speaker assembly, with the protective/decorative cover removed, showing the right end, bottom and rear thereof.
Figure 22:
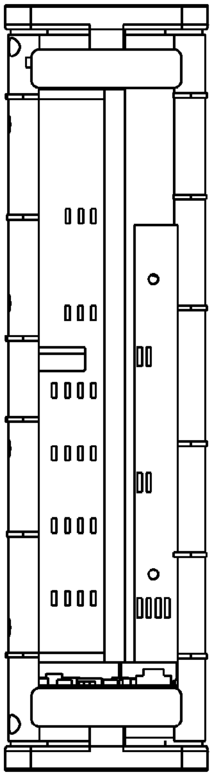
FIG. 22 is a bottom plan view of the new stereo speaker assembly with the protective/decorative cover removed.
Figure 23:
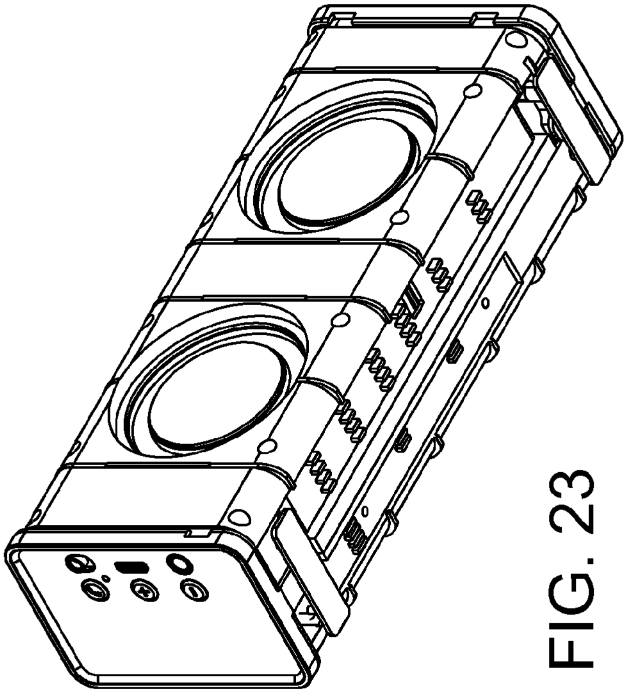
FIG. 23 is an isometric view of the new stereo speaker assembly, with the protective/decorative cover removed, showing the left end, bottom and rear thereof.
Figure 27:
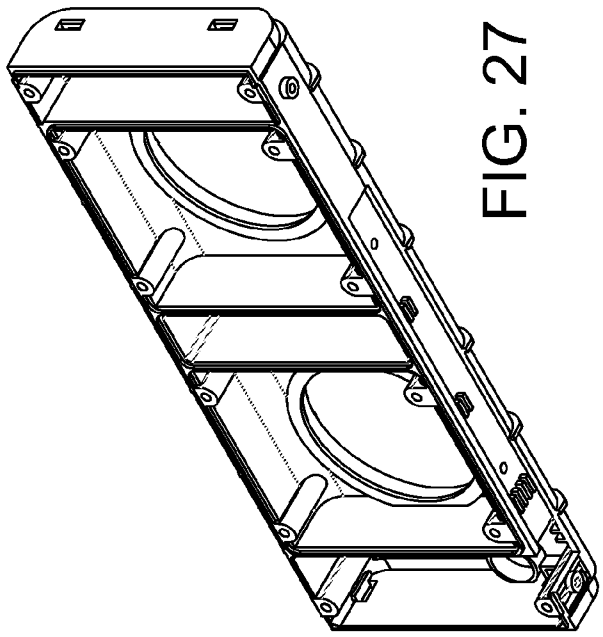
FIG. 27 is an isometric view of the front bezel of the stereo speaker assembly housing, showing the left end, bottom and rear thereof.
Figure 25:
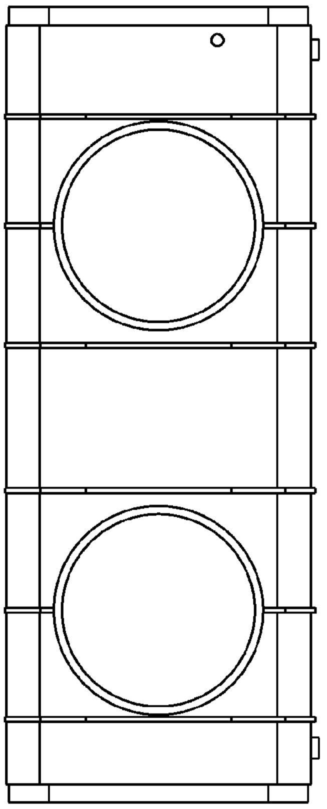
FIG. 25 is a front elevational view of the front bezel of the stereo speaker assembly housing.
Figure 26:
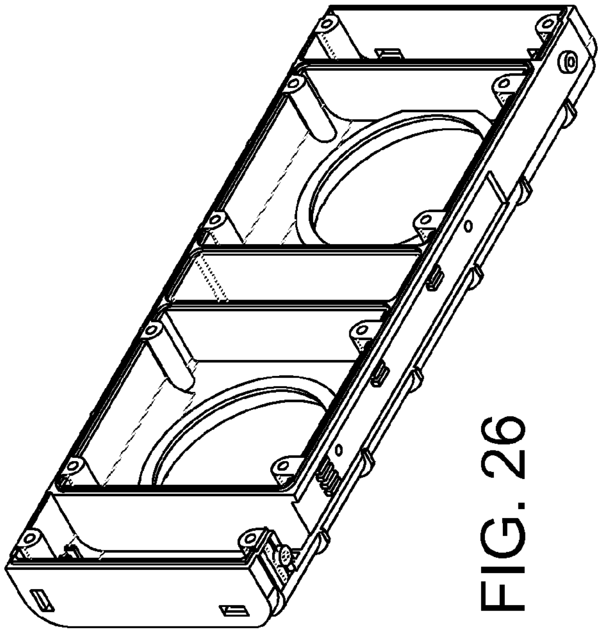
FIG. 26 is an isometric view of the front bezel of the stereo speaker assembly housing, showing the right end, bottom and rear thereof.
Figure 31:
FIG. 31 is a right end plan view of the front bezel of the stereo speaker assembly housing.
Figure 28:
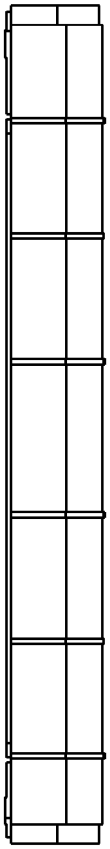
FIG. 28 is a top plan view of the front bezel of the stereo speaker assembly housing.
Figure 30:
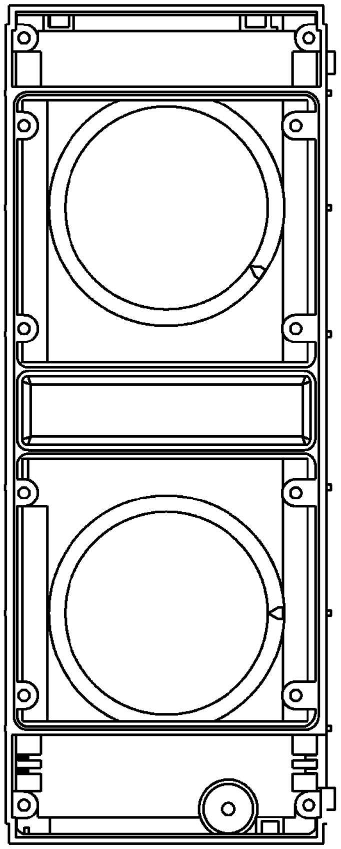
FIG. 30 is a rear elevational view of the front bezel of the stereo speaker assembly housing.
Figure 32:
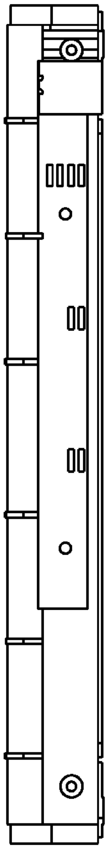
FIG. 32 is a bottom plan view of the front bezel of the stereo speaker assembly housing.
Figure 29:
FIG. 29 is a left end plan view of the front bezel of the stereo speaker assembly housing.
Figure 36:
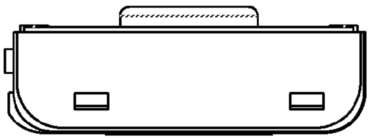
FIG. 36 is a right end plan view of the front bezel of the stereo speaker assembly housing with the audio speakers installed therein.
Figure 33:
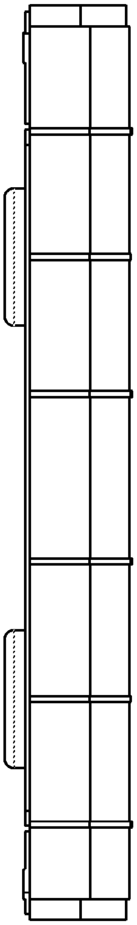
FIG. 33 is a top plan view of the front bezel of the stereo speaker assembly housing with the audio speakers installed therein.
Figure 35:
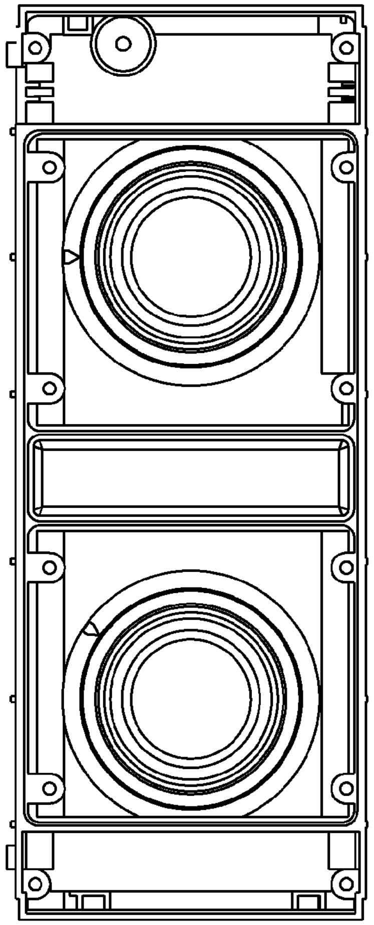
FIG. 35 is a rear elevational view of the front bezel of the stereo speaker assembly housing with the audio speakers installed therein.
Figure 34:
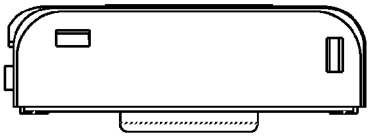
FIG. 34 is a left end plan view of the front bezel of the stereo speaker assembly housing with the audio speakers installed therein.
Figure 37:
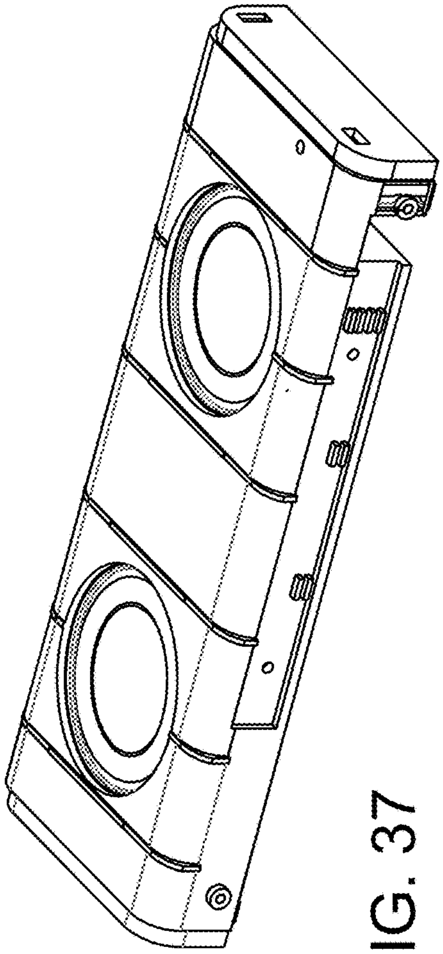
FIG. 37 is an isometric view of the front bezel of the stereo speaker assembly housing with the audio speakers installed therein, showing the right end, bottom and front thereof.
Figure 38:
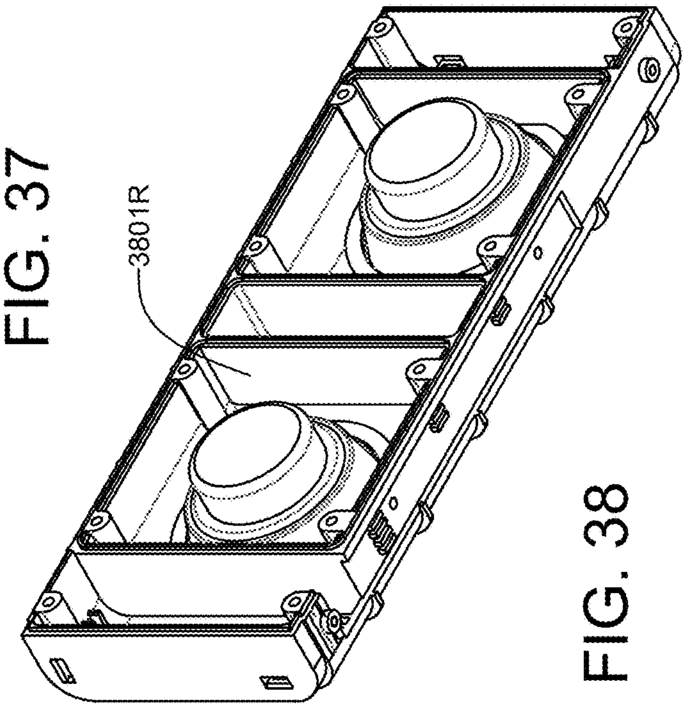
FIG. 38 is an isometric view of the front bezel of the stereo speaker assembly housing with the audio speakers installed therein, showing the right end, bottom and rear thereof.
Figure 39:
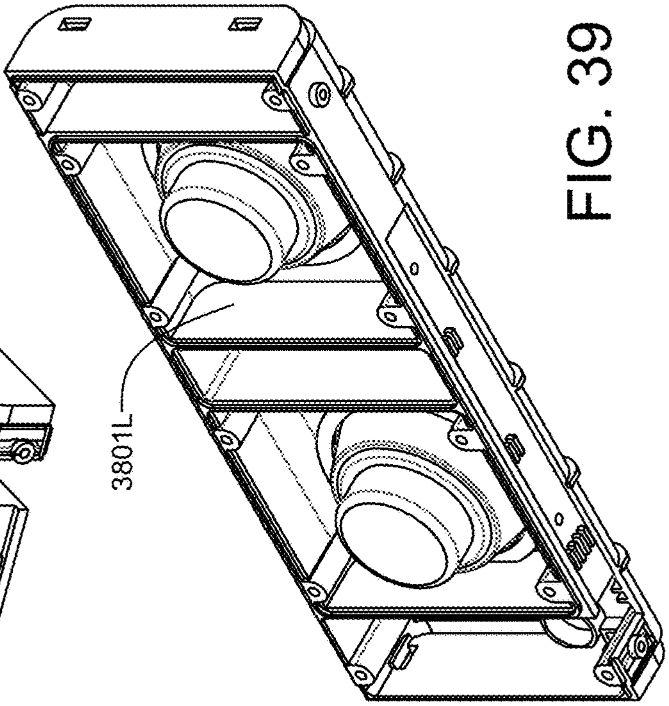
FIG. 39 is an isometric view of the front bezel of the stereo speaker assembly housing with the audio speakers installed therein, showing the left end, bottom and rear thereof.
Figures 40, 41:
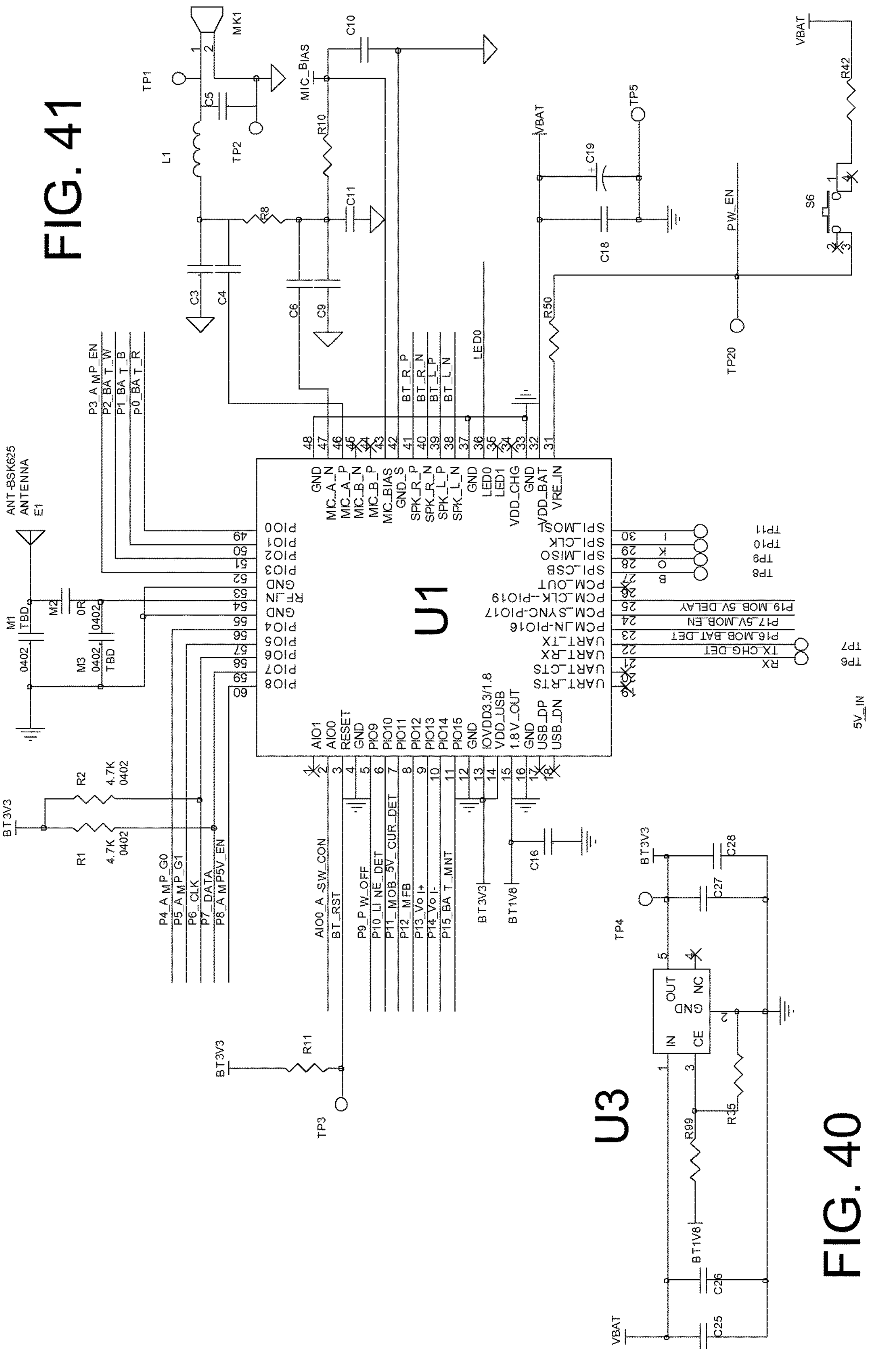
FIG. 40 is a schematic diagram of a voltage regulator circuit that converts battery voltage to 3.3 volts for the Bluetooth module.
FIG. 41 is a schematic diagram of the Bluetooth circuitry.
Figure 42:
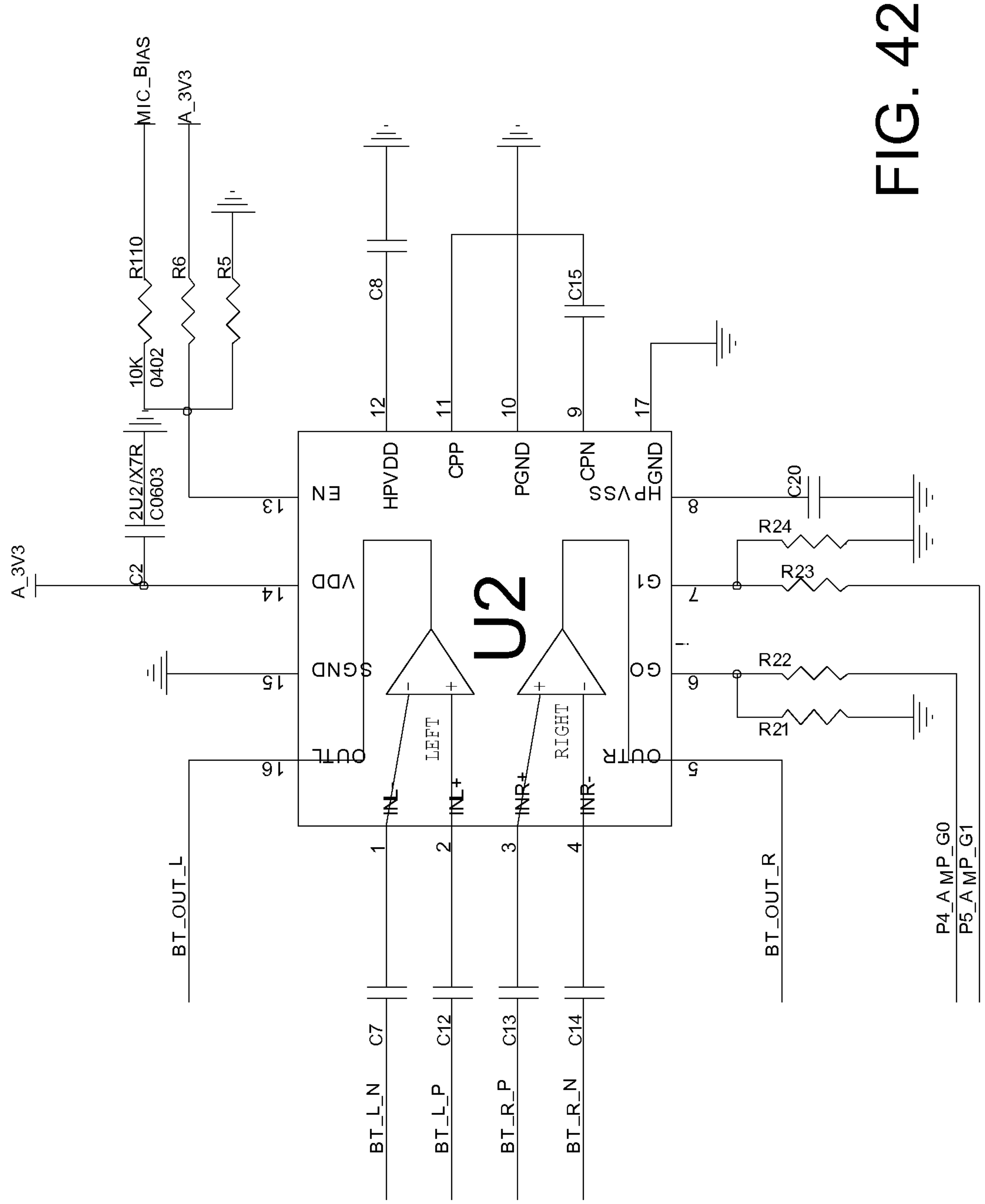
FIG. 42 is a schematic diagram of an audio filter circuit that takes signal inputs from the Bluetooth circuitry and filters and pre-amplifies those signals.
Figure 43:
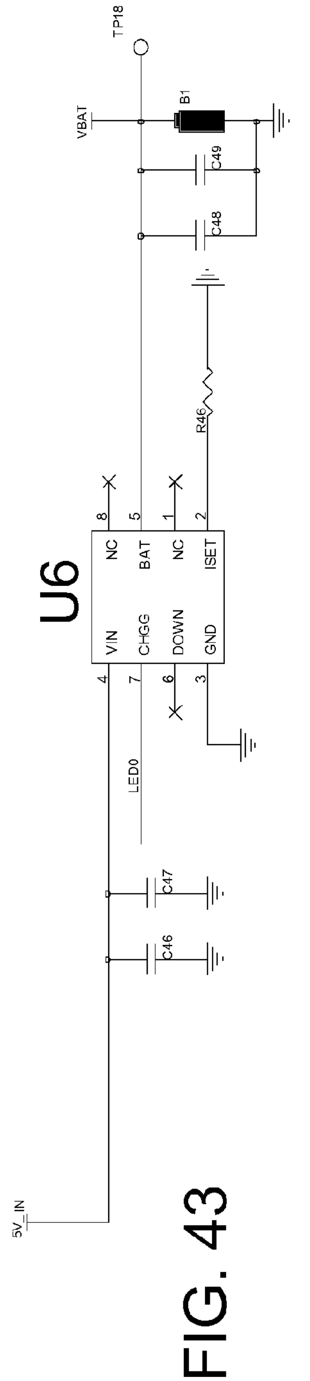
FIG. 43 is a schematic diagram of on-board battery charging circuitry.
Figure 44:
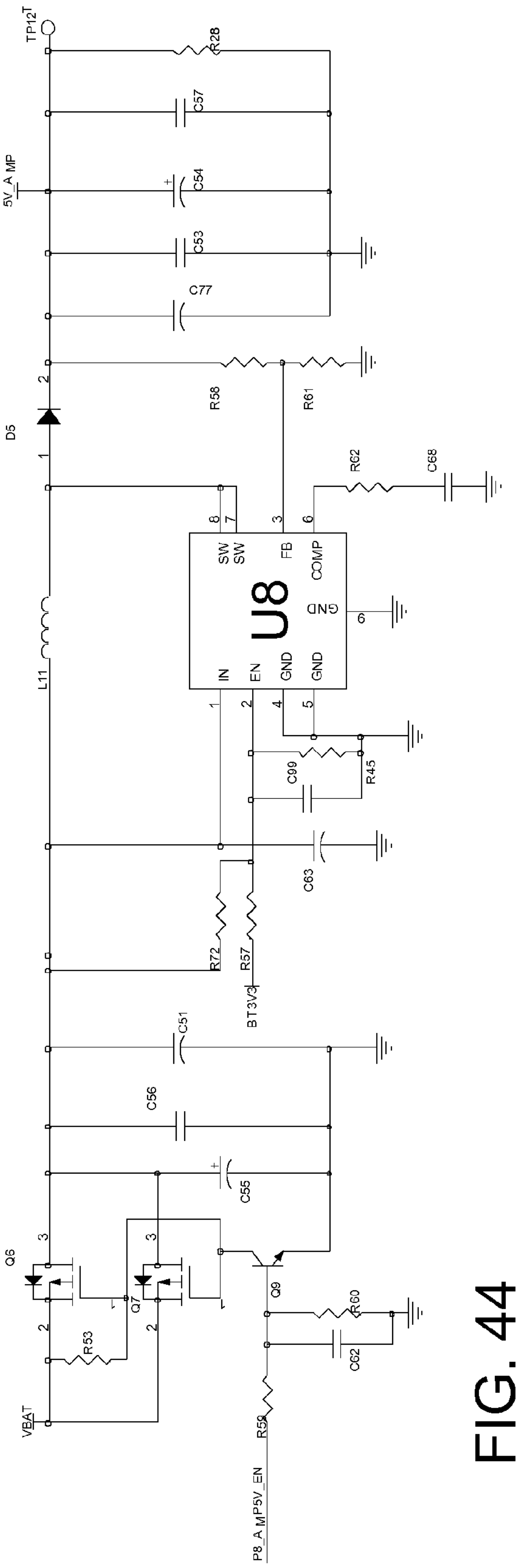
FIG. 44 is a schematic diagram of a voltage regulator circuit that takes battery voltage and boosts it to 5 volts for the audio amplifier circuitry.
Figure 45:
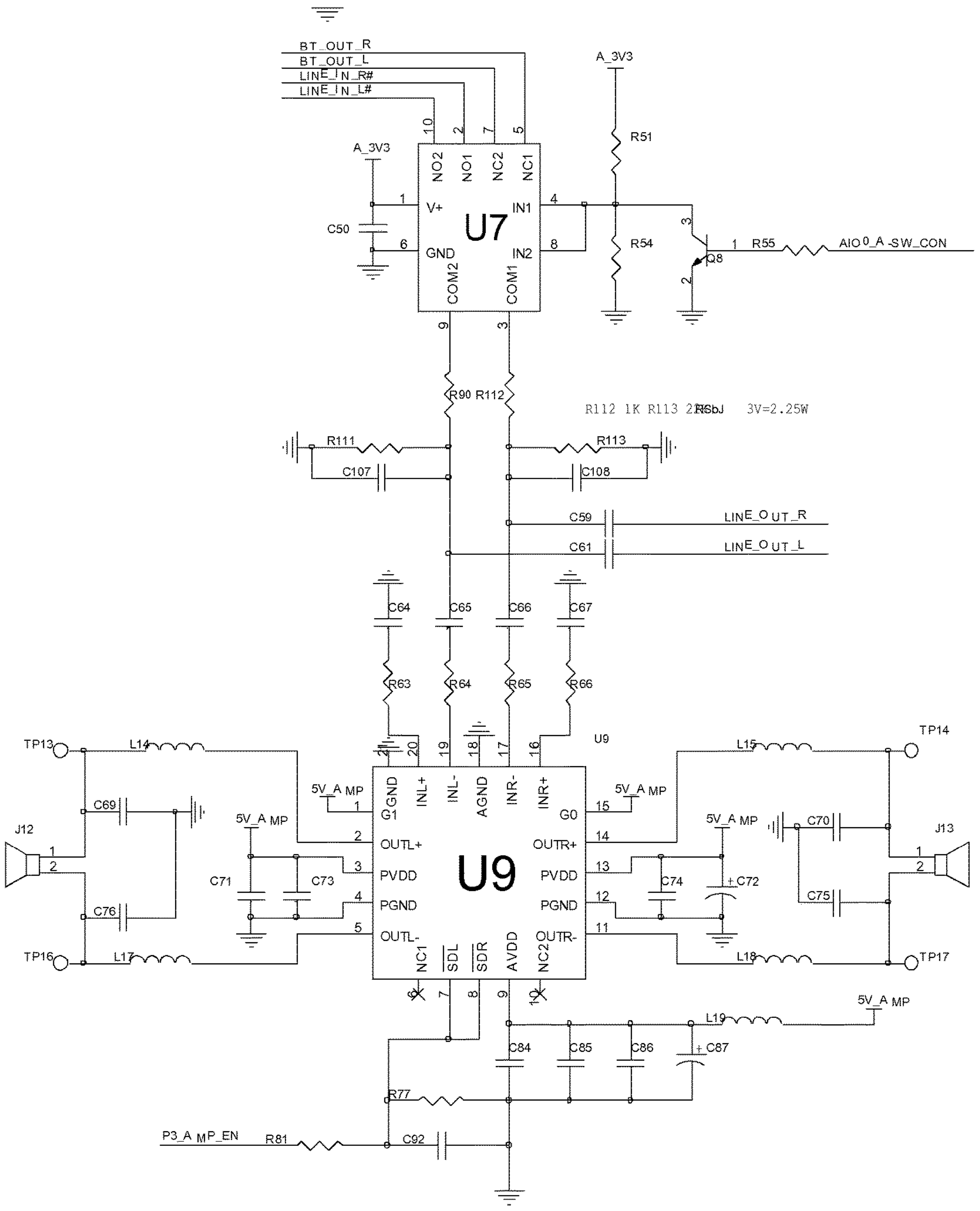
FIG. 45 is a schematic diagram of audio line switch circuitry that switches between Bluetooth audio out and Lin-In channels, and outputs one or the other to the amplifier circuitry below.
Figure 46:
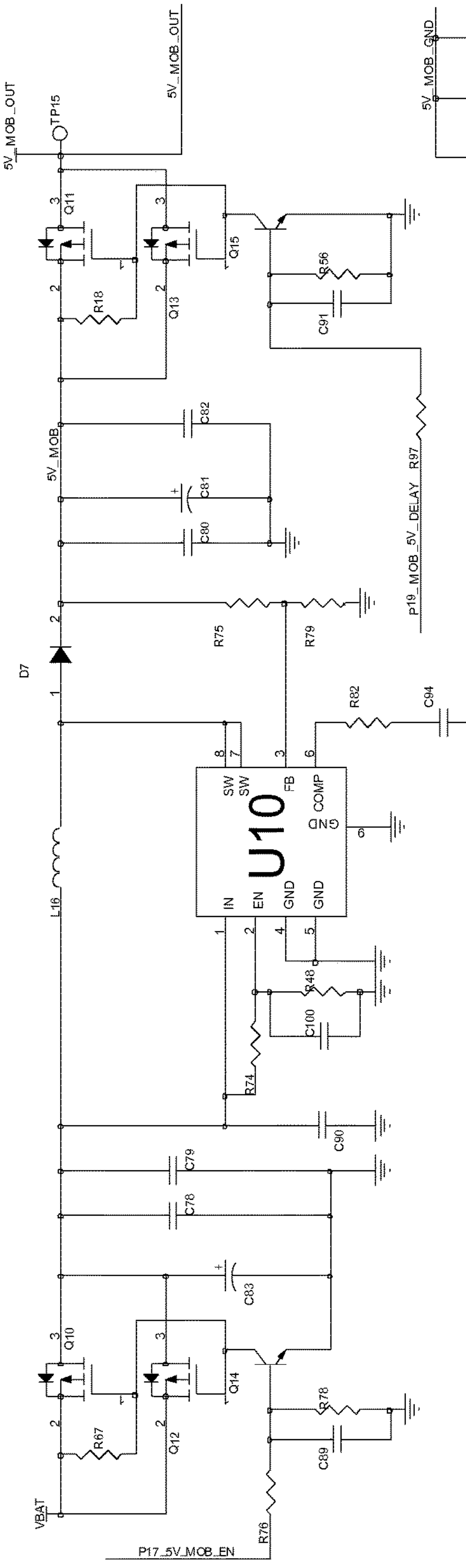
FIG. 46 is a schematic diagram of a voltage regulator circuit that boosts on-board battery voltage to 5 volts for charging an interconnected mobile device.
Figure 47:
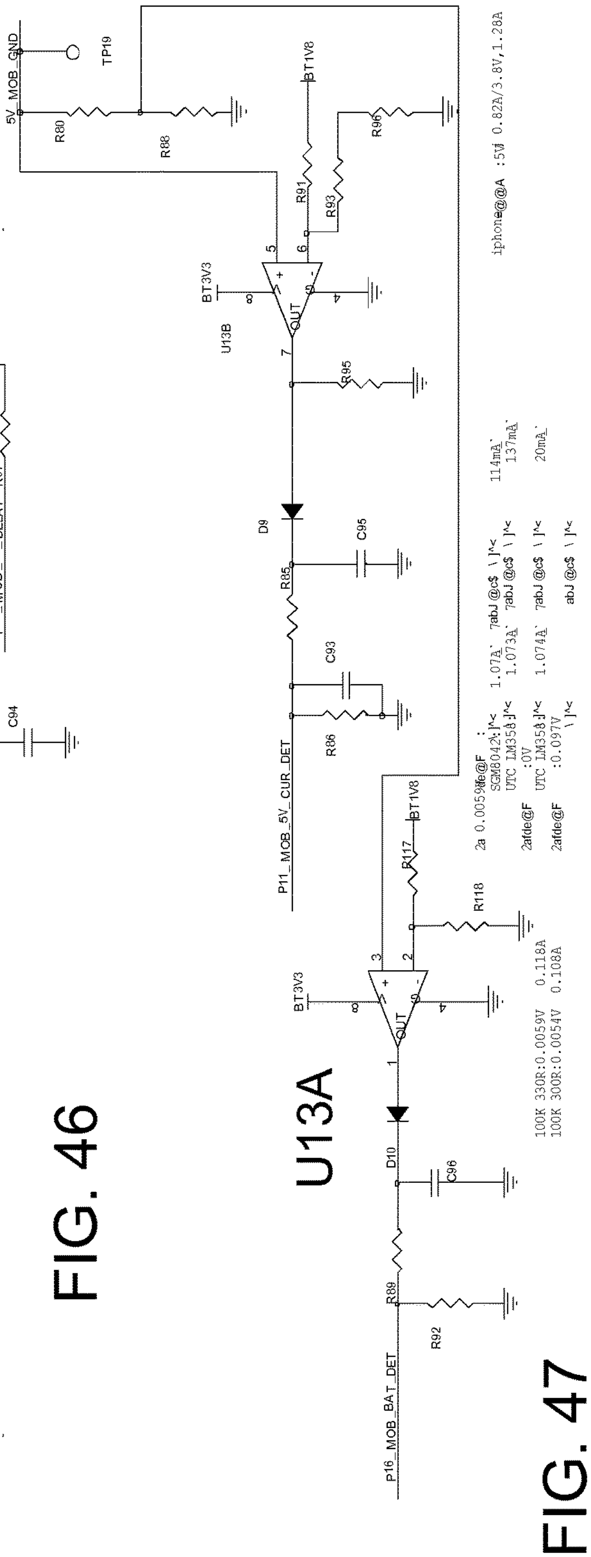
FIG. 47 is a schematic diagram of circuitry that detects the presence or non-presence of an interconnected mobile device to the charging port.

Referring now, specifically, to FIG. 7, the left end panel 700 incorporates an external USB charging port 701 that can be used to charge the batteries of connected handheld devices which draw between 0.3 and 1.0 amp of charging current. The left end panel 700 also includes a 3.5 mm audio-out jack 702, which can be used to interconnect external devices having audio inputs in a daisy-chain array. Also included on end panel 700 is a battery check button 703 and a battery indicator light 704. To check the charge level of the audio speaker assembly's on-board battery, the battery check button 703 is momentarily pushed. While the button is depressed the charge indicator light 704 will display a white light for 50-100 percent charge, a blue light for a 10-50 percent charge, and a red light for 0-10 percent charge.

Figure 2:
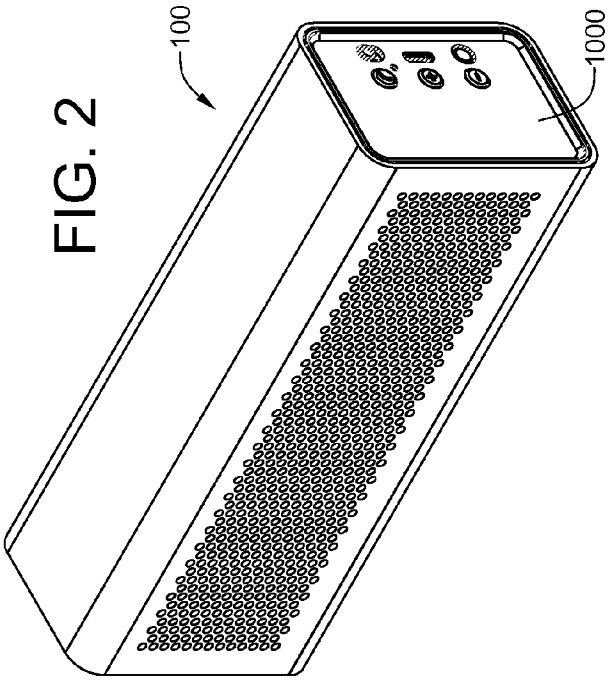
FIG. 2 is an isometric view of the new, fully-assembled stereo speaker assembly showing the right end, top and front thereof.
Figure 1:
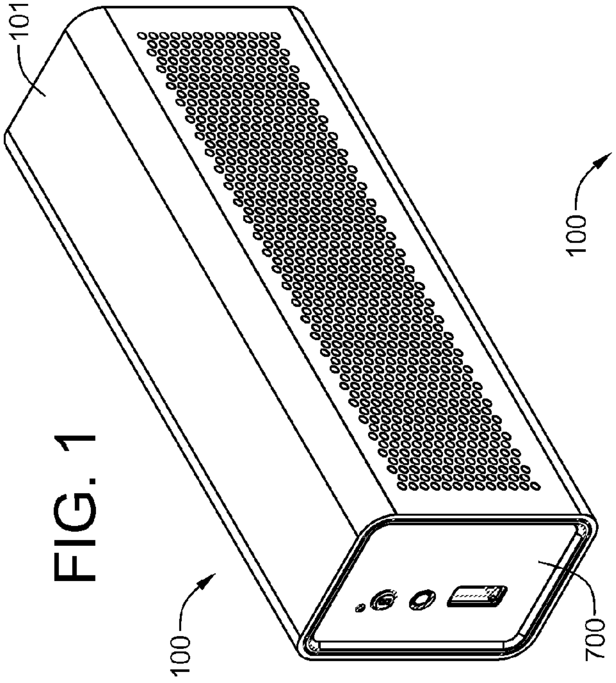
FIG. 1 is an isometric view of the new, fully-assembled stereo speaker assembly showing the left end, top and front thereof.
Figure 3:
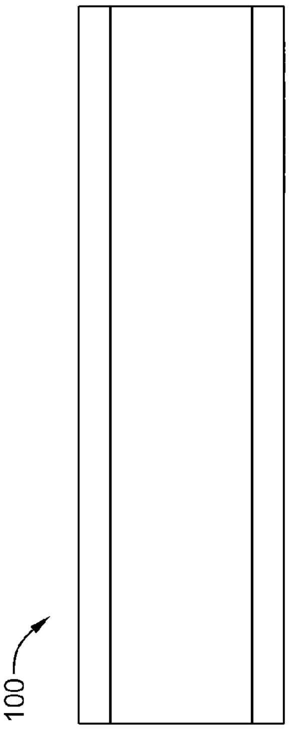
FIG. 3 is a top plan view of the new, fully-assembled stereo speaker assembly.
Figure 6:
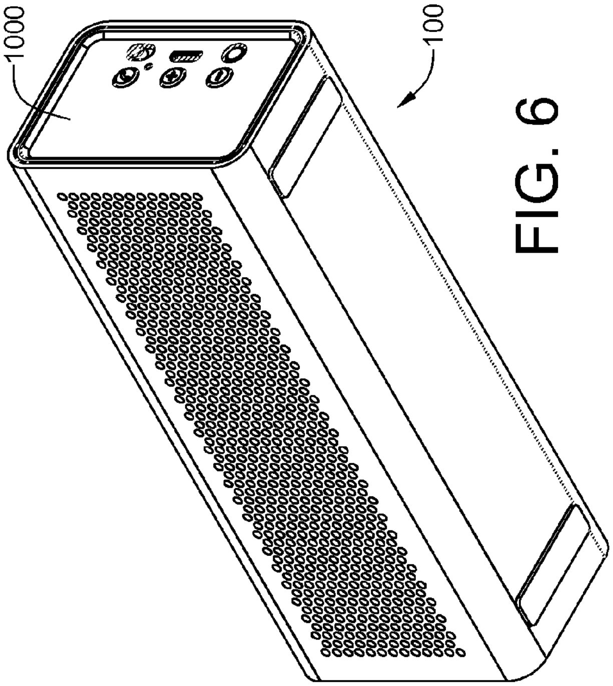
FIG. 6 is an isometric view of the new, fully-assembled stereo speaker assembly showing the right end, bottom and front thereof.
Figure 4:
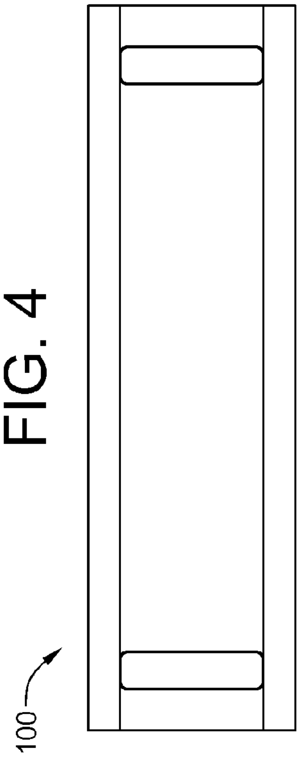
FIG. 4 is a bottom plan view of the new, fully-assembled stereo speaker assembly.
Figure 5:
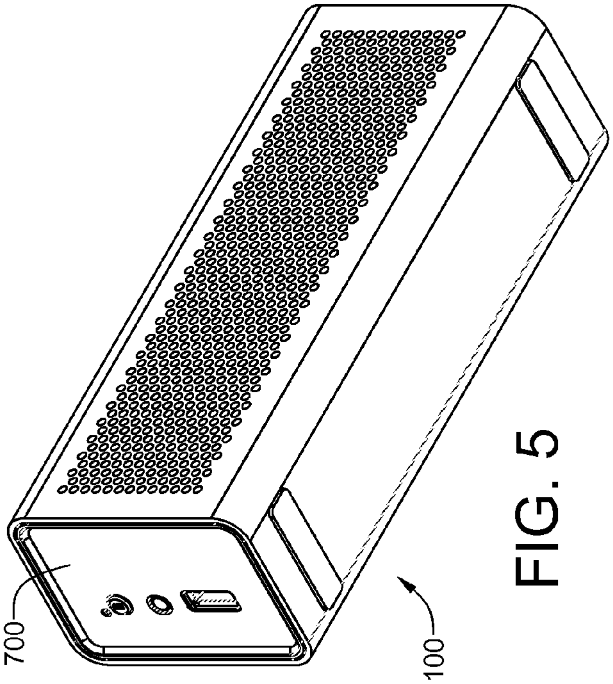
FIG. 5 is an isometric view of the new, fully-assembled stereo speaker assembly showing the left end, bottom and front thereof.
Figure 10:
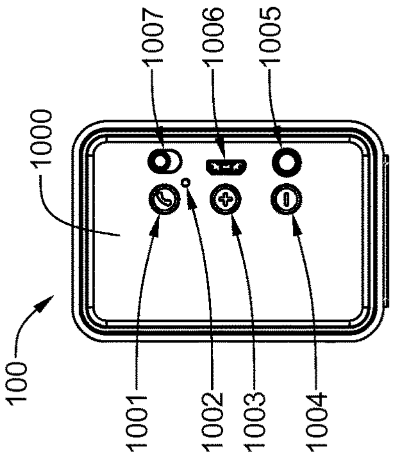
FIG. 10 is a right end elevational view of the new, fully-assembled stereo speaker assembly.
Figure 8:
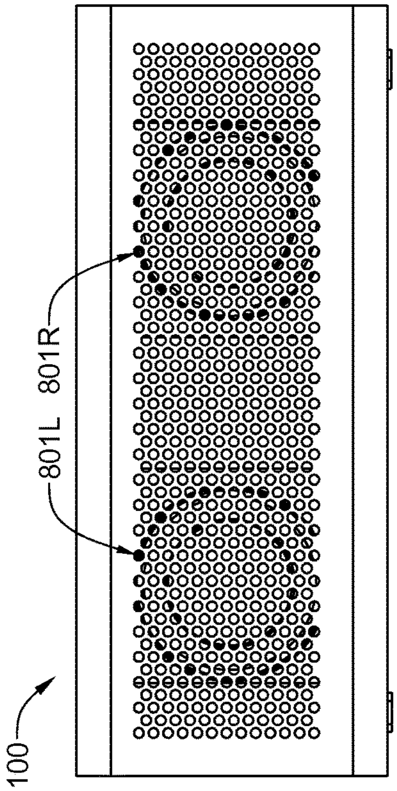
FIG. 8 is a front elevational view of the new, fully-assembled stereo speaker assembly.
Figure 9:
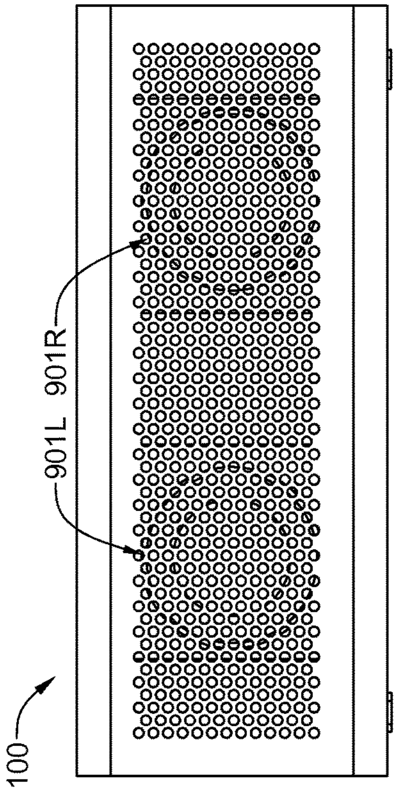
FIG. 9 is a rear elevational view of the new, fully-assembled stereo speaker assembly.

Referring now, specifically, to FIG. 10, the right end panel 1000 incorporates a power switch 1007, a power/synchronize status light 1002, a charging port 1006 for charging the on-board battery, a 3.5 mm audio-in port 1005, a phone/pairing/pause button 1001, a volume up/skip track forward button 1003, and a volume down/skip track back button 1004. When the phone/pairing/pause button 1001 is pushed in response to an incoming telephone call on a smartphone, an incoming audio playback signal from a Bluetooth connected smartphone is suppressed in favor of the audio signal for the incoming telephone call from the same smartphone. When the telephone call is terminated, the audio playback signal is, once again, given priority for speaker output. The speaker assembly 100 can be used as a speaker phone.

Referring now to FIGS. 11 to 24, the speaker assembly 100 is shown with the protective cover 101 removed, thereby exposing the rear housing portion 1100. The on-board battery 1101 is visible in this view, as are left and right woofers 801L and 801R, respectively. Most of the on-board circuitry is installed in chamber 1103, as is an on-board microphone 1102, which provides speaker phone capability.

Referring now to FIGS. 25 to 39, the front housing bezel 2501 is screwed to the rear housing portion 1100 shown in FIGS. 11 to 24. The woofers 801L and 801R, each of which is operative for a different audio channel, are actually mounted in the bezel 2501, which is then secured to the rear housing portion. The passive radiators 901L and 901R are acoustically coupled to the woofers. It will be seen that when the bezel 2501 is secured to the rear housing portion, an acoustic chamber—open at the front and rear of the speaker assembly 100—is formed around each woofer, or audio speaker, and its acoustically-coupled passive radiator. Thus, two chamber walls formed by abutting panel pairs 1104L/3801L and 1104R/3801R are positioned between woofers 801L and 801R and between passive radiators 901L and 901R. In addition, the onboard battery 1101 is positioned between the abutting panels pairs 1104L/3801L and 1104R/3801R. It should be readily apparent that the two chamber walls and the battery provide acoustic decoupling of the sound-generating devices for the first audio channel from the sound-generating devices for the second audio channel. The fidelity of the sound output from the speaker assembly 100 is enhanced by this feature.

FIGS. 40 to 47 show schematic diagrams for circuitry that is used in the speaker assembly 100.

U1 Bluetooth Module: The Bluetooth Module uses a programmable microcontroller to control the device. It includes the Bluetooth, antenna network, microphone input, audio input, audio output, and several general purpose inputs and outputs. The inputs monitor other parts of the circuit and the user inputs. The outputs control other parts of the circuit and the LED indicators.

U3 Voltage Regulator—3.3V Bluetooth: This voltage regulator converts the voltage from the battery to 3.3V for the Bluetooth Module. It latches on from the Bluetooth Module 1.8V output.

U6 Battery Charging IC: The battery charging IC only works when there is a 5V supply connected to the device. It manages the charging of the Lithium battery and has an LED output to indicate the charging status.

U8 Voltage Regulator—5V Amplifier: This voltage regulator takes the voltage from the battery and boosts it to 5V for the audio amplifier. It is enabled by the Bluetooth Module PIO8 pin. The Bluetooth Module firmware decides when to enable or disable it.

U10 Voltage Regulator—5V Mobile Device: This voltage regulator takes the voltage from the battery and boosts it to 5V for charging a mobile device that is connected. The voltage regulator is enabled by the Bluetooth Module PI017 pin but the 5V output from the regulator is enabled by the PIO19 pin. The Bluetooth Module firmware decides when to enable these. Because the 5V output is enabled from a separate IO pin, there can be a delay set to allow the voltage regulator to stabilizes first.

U13 Mobile Device Detector: This circuit includes two comparators that monitor the ground return line from the mobile device. The ground return line connects back to the main circuit ground through two current sensing resistors (R80 and R88). These current sensing resistors create a small voltage drop using the voltage divider principle. The comparators compare this small voltage drop to a fixed reference voltage that is set by some resistor values (R91, R93, R96 and R117, R118). The amount of current going through the mobile device will determine the voltage drop. If the mobile device is charging, there will be more current. More current will result in a larger voltage sensed at these two resistors. When the voltage sensed becomes greater than the reference voltage, the comparators will output a logic high. When the voltage drops back below the reference voltage, the comparators will output a logic low. These logic levels are monitored by the Bluetooth Module which then controls the 5V output to the mobile device for charging it. Because there are two comparators, there can be two different current thresholds sensed which can be used to detect what an attached device is doing, for example: device charging, device sensed but not charging, and no device detected.

U2 Audio Filter IC: This IC takes the Left and Right audio channels from the Bluetooth Device and then does filtering/pre-amp before sending it to the next stage (U7).

U11 Audio Filter IC: This IC takes the Left and Right audio channels from the Line In and then does filtering/pre-amp before sending it to the next stage (U7).

U7 Audio Line Switch: This switches between Bluetooth audio out and the Line in channels and then outputs one or the other to the amplifier IC (U9). The switching is controlled by the Bluetooth Module AIO0 pin.

U9 Stereo Amplifier: This is the main audio amplifier. It amplifies the audio from the Bluetooth Module or the Line input and powers the drivers (speakers). It is enabled by the Bluetooth Module PIO3 pin.

S5 on/off switch: When it is switched on, a momentary DC pulse from the battery is sent to the VRE_IN pin on the Bluetooth module and a signal to the RST_DIS circuit which keeps the Bluetooth from further resetting (BT_RST is an active low reset). When it is switched off, the Bluetooth module can detect this and shut down everything gracefully so you don't get popping sounds.

The following chips and vendors are used therein:

U1: Bluetooth Module, CSR BlueCore BC57E6;

U8, U10: Switching Voltage regulator, Diodes Inc. AP1609 (or equivalent);

U13: Dual OP-AMP, Texas Instruments LM358 (or equivalent);

U6: Li-ion Battery Charger IC, Linear Technology LTC4002 (or equivalent);

U5: Audio Gain Control, Princeton Technology PT2257-S;

U9: Stereo Class-D Audio Amplifier, Power Analog Microelectronics PAM8404;

U7: Audio Switch, AMS AS1747 (or equivalent); and

U2, U11: Stereo Amplifier, Power Analog Microelectronics PAMP8908.

Although only a single embodiment of the invention has been disclosed herein, it will be obvious to those of ordinary skill in the art that changes and modifications may be made thereto without departing from the scope and spirit of the invention as hereinafter claimed. For example, the size of the audio speakers used determines the minimum size of the audio speaker assembly. Different sized audio speaker assemblies, constructed using the techniques disclosed herein, can be tailored to not only varied consumer price points, but levels of speaker assembly compactness and audio fidelity levels, as well.

What is claimed is:

1. A compact speaker assembly comprising:

a housing including a rear housing portion and a bezel secured to the rear housing portion, said rear housing portion and said bezel forming first and second chambers;

a first audio speaker mounted within the first chamber and a first passive acoustic radiator installed within the first chamber, the first passive acoustic radiator being acoustically coupled to the first audio speaker;

a second audio speaker mounted within the second chamber and a second passive acoustic radiator installed within the second chamber, the second passive acoustic radiator being acoustically coupled to the second audio speaker, the second audio speaker being operative for a different audio channel from the first audio speaker;

wherein the first and second chambers, by being spaced apart and sharing no common panel between them, provide acoustic decoupling between said first and second audio speakers;

stereo audio amplifier circuitry having first and second channel audio inputs and first and second driver outputs coupled to the first and second audio speakers, respectively;

a Bluetooth module which enables wireless connection of first and second audio outputs from a mobile device to the first and second audio inputs, respectively, of the stereo audio amplifier circuitry;

an onboard battery for powering the stereo audio amplifier circuitry and the Bluetooth module;

battery charging circuitry for charging the onboard battery from a 5-volt external source; and means for charging the battery of an external mobile device from the onboard battery.

2. The compact speaker assembly of claim 1, wherein said means for charging comprises:

a voltage converter/regulator that converts onboard battery voltage to 5-volts DC;

a USB port coupled to an output from the voltage converter/regulator, said USB port providing a connector for a cable used to interconnect the external mobile device and the compact speaker assembly.

3. The compact speaker assembly of claim 1, which further comprises a Line-In plug for a hard-wired stereo inputs from an external mobile device to said first and second channel audio inputs.

4. The compact speaker assembly of claim 3, which further comprises an amplifier-specific voltage converter/regulator, which converts onboard battery voltage to a stable voltage required by the audio amplifier, said amplifier-specific voltage converter/regulator being enabled only when either hard-wired stereo inputs from an external mobile device are being received, or when audio inputs are being received by the Bluetooth module.

5. The compact speaker assembly of claim 1, which further comprises a Bluetooth audio filter, which takes signal inputs from the Bluetooth circuitry and performs filtering and pre-amplification thereof before sending them to the audio amplifier circuitry.

6. The compact speaker assembly of claim 1, which further comprises mobile device detection circuitry which determines if a mobile device is connected and charging, connected but not charging or not connected.

7. The compact speaker assembly of claim 1, wherein each passive acoustic radiator faces a direction opposite that faced by its acoustically-coupled speaker.

8. A compact speaker assembly comprising:

a housing including a rear housing portion and a bezel secured to the rear housing portion, said rear housing portion and said bezel forming first and second chambers;

a first audio speaker mounted within the first chamber and a first passive acoustic radiator installed within the first chamber, the first passive acoustic radiator being acoustically coupled to the first audio speaker;

a second audio speaker mounted within the second chamber and a second passive acoustic radiator installed within the second chamber, the second passive acoustic radiator being acoustically coupled to the second audio speaker, the second audio speaker being operative for a different audio channel from the first audio speaker;

wherein the first and second chambers, by being spaced apart and sharing no common panel between them, provide acoustic decoupling between said first and second audio speakers;

stereo audio amplifier circuitry having first and second channel audio inputs and first and second driver outputs coupled to the first and second audio speakers, respectively;

a Bluetooth module which enables wireless connection of first and second audio playback outputs from a mobile phone device to the first and second channel audio inputs, respectively, of the stereo audio amplifier circuitry, as well as wireless connection of audio output from a telephone call received by the mobile phone device to at least one of said first and second audio inputs;

an on board battery for powering the stereo audio amplifier circuitry and the Bluetooth module;

a microphone that provides speaker phone capability to the compact speaker assembly, said microphone producing audio signals which are transmitted to the mobile phone device via the Bluetooth module; and wherein audio output from a received telephone call is given priority over audio playback outputs, with audio playback outputs being suppressed for the duration of a received telephone call.

9. The compact speaker assembly of claim 8, which further comprises first and second passive acoustic radiators installed within said first and second chambers, respectively, each passive acoustic radiator being acoustically coupled to the speaker with which it shares a chamber.

10. The compact speaker assembly of claim 8, which further comprises:

battery charging circuitry for charging the onboard battery from a 5-volt external source; and means for charging the battery of an external mobile device from the onboard battery.

11. The compact speaker assembly of claim 8, wherein said means for charging comprises:

a voltage converter/regulator that converts onboard battery voltage to 5-volts DC;

a USB port coupled to an output from the voltage converter/regulator, said USB port providing a connector for a cable used to interconnect the external mobile device and the compact speaker assembly.

12. The compact speaker assembly of claim 11, which further comprises an amplifier-specific voltage converter/regulator, which converts onboard battery voltage to a stable voltage required by the audio amplifier, said amplifier-specific voltage converter/regulator being enabled only when either hard-wired stereo inputs from an external mobile device are being received, or when audio inputs are being received by the Bluetooth module.

13. The compact speaker assembly of claim 8, which further comprises a Bluetooth audio filter, which takes signal inputs from the Bluetooth circuitry and performs filtering and pre-amplification thereof before sending them to the audio amplifier circuitry.

14. The compact speaker assembly of claim 8, which further comprises a Line-In audio filter, which takes Line-In signal inputs and performs filtering and pre-amplification thereof before sending them to the audio amplifier circuitry.

15. The compact speaker assembly of claim 8, which further comprises mobile device detection circuitry which determines if a mobile devices is connected and charging, connected by not charging or not connected.

16. The compact speaker assembly of claim 8, wherein each passive acoustic radiator faces a direction opposite that faced by its acoustically-coupled speaker.

17. A compact speaker assembly comprising:

a housing including a rear housing portion and a bezel secured to the rear housing portion, said rear housing portion and said bezel forming first and second chambers;

a first audio speaker mounted within the first chamber and a first passive acoustic radiator installed within the first chamber, the first passive acoustic radiator being acoustically coupled to the first audio speaker;

a second audio speaker mounted within the second chamber and a second passive acoustic radiator installed within the second chamber, the second passive acoustic radiator being acoustically coupled to the second audio speaker, the second audio speaker being operative for a different audio channel from the first audio speaker;

wherein the first and second chambers, by being spaced apart and sharing no common panel between them, provide acoustic decoupling between said first and second audio speakers;

stereo audio amplifier circuitry having first and second channel audio inputs and first and second driver outputs coupled to the first and second audio speakers, respectively;

a Bluetooth module which enables wireless connection of first and second audio playback outputs from a mobile phone device to the first and second channel audio inputs, respectively, of the stereo audio amplifier circuitry, as well as wireless connection of audio output from a telephone call received by the mobile phone device to at least one of said first and second audio inputs;

an on board battery for powering the stereo audio amplifier circuitry and the Bluetooth module;

a microphone that provides speaker phone capability to the compact speaker assembly, said microphone producing audio signals which are transmitted to the mobile phone device via the Bluetooth module; and wherein audio output from a received telephone call is given priority over audio playback outputs, with audio playback outputs being suppressed for the duration of a received telephone call.

18. The compact speaker assembly of claim 17, wherein each passive acoustic radiator faces a direction opposite that faced by its acoustically-coupled speaker.

19. The compact speaker assembly of claim 1, which further comprises a visual battery charge indicator that visually displays a current charge level of the onboard battery.

20. The compact speaker assembly of claim 19, wherein the visual battery charge indicator displays the current charge level of the onboard battery in response to a battery check button.

* * * * *